United States Patent [19]

Sefton et al.

[11] Patent Number: 5,049,988
[45] Date of Patent: Sep. 17, 1991

[54] SCANNING T.V. CAMERA

[75] Inventors: Alan K. Sefton, Haslemere; David J. Cotton, Aldershot, both of United Kingdom

[73] Assignee: Pearpoint Limited, Bordon, United Kingdom

[21] Appl. No.: 392,425

[22] Filed: Aug. 10, 1989

[51] Int. Cl.$^5$ .................. H04N 7/18; H04N 5/222
[52] U.S. Cl. ...................... 358/93; 358/185; 358/108
[58] Field of Search .............. 358/93, 100, 210, 98, 358/108, 87, 185

[56] References Cited

U.S. PATENT DOCUMENTS

| | | | |
|---|---|---|---|
| 4,238,828 | 12/1980 | Hay | 358/100 |
| 4,258,388 | 3/1981 | Weisman | 358/100 |
| 4,321,625 | 3/1982 | Smith | 358/210 |
| 4,369,467 | 1/1983 | Smith | 358/210 |
| 4,740,839 | 4/1988 | Phillips | 358/180 |
| 4,881,122 | 11/1989 | Murakami | 358/210 |

FOREIGN PATENT DOCUMENTS

| | | |
|---|---|---|
| 2210530 | 6/1989 | United Kingdom . |
| 2215941 | 9/1989 | United Kingdom . |
| 2215942 | 9/1989 | United Kingdom . |

*Primary Examiner*—John K. Peng
*Attorney, Agent, or Firm*—H. Jay Spiegel

[57] ABSTRACT

A scanning T.V. camera has an image-sensor which is movable in the plane of the camera lens. Feedback signals are derived from the image-sensor drive(s) and/or from the image-sensor movements, to indicate the position of the image-sensor and thus that section of the field of view which is being inspected. The position of the image-sensor is displayed on a T.V. monitor screen which shows that section being inspected and has an optical overlay which represents the field of view of the camera. A controller is provided to generate command signals for moving said image-sensor to a commanded inspection position which can be compared with the actual position of the image-sensor.

9 Claims, 6 Drawing Sheets

SCANNING T.V. CAMERA

FIELD OF THE INVENTION

This invention relates to cameras, and particularly to scanning T.V. cameras which are required to produce a tilt-pan effect.

BACKGROUND OF THE INVENTION

Scanning T.V. cameras are intended for use in inspection, particularly in the inspection of relatively inaccessible areas such as the interiors of sewers and other pipe-lines, and also in other applications such as surveillance; one example of a scanning T.V. camera is the subject of our published British Patent Application, No. 2210530 A, the contents of which are incorporated herein by reference.

Cameras for these purposes should have a wide field of view, usually incorporate a wide-angle lens, and are provided with operating mechanisms to effect scanning of the area to be inspected; surveillance cameras often incorporate a telescopic lens. T.V. cameras usually now incorporate a CCD (charged coupled device) image sensor in the focal plane of the lens, and the sensor can be shifted on the X and Y axes to produce the tilt/pan effects for scanning. Alternatively, the camera may comprise a Vidicon tube which carries an end target sensor and which can be pivoted or otherwise moved to swing the target across the focal plane area of the lens. Suitably, the CCD sensor or Vidicon tube is driven by first and second electric motors that drive to X-Y positions which are detected by relative and absolute feed-back sensors.

It is an object of the present invention to provide a scanning T.V. camera having provision for indicating the section of the field of view which is being inspected.

SUMMARY OF THE INVENTION

According to the present invention, there is provided a scanning T.V. camera having an image-sensor which is movable in the plane of the camera lens by drive means, characterised in that means are provided to derive feed-back signals from the image-sensor drive(s) and/or from the image-sensor movements to indicate the position of the image-sensor and thus that section of the field of view which is being inspected.

Suitably, said drive means comprise first and second electric drive motors, and the feed-back signals may be derived from the electric-motor drives by relative and absolute feed-back sensors, the signals being processed to produce an image on a T.V. monitor. The image may comprise a rectangle representing said section and moving within a circular overlay representing said field of view, and a second rectangle may be included to represent a commanded position.

DESCRIPTION OF A PREFERRED EMBODIMENT OF THE INVENTION

The objects and functions of the present camera are similar to those of the camera described in our British Patent Publication No. 2210530 A.

Figure 1:
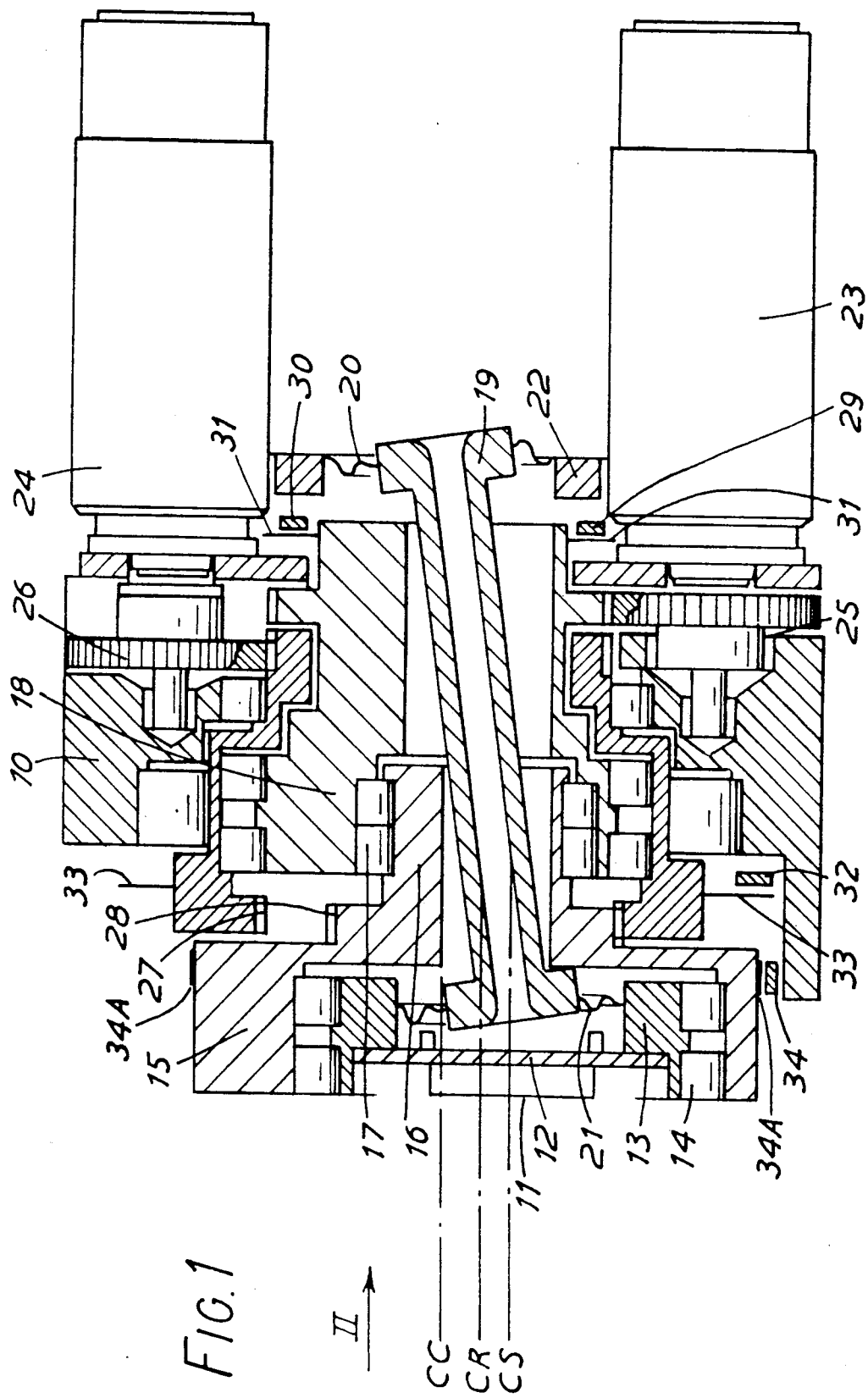
FIG. 1 is a detail sectional elevation showing the operating mechanism for effecting X-Y shift of the sensor of a T.V. camera.
Figure 2:
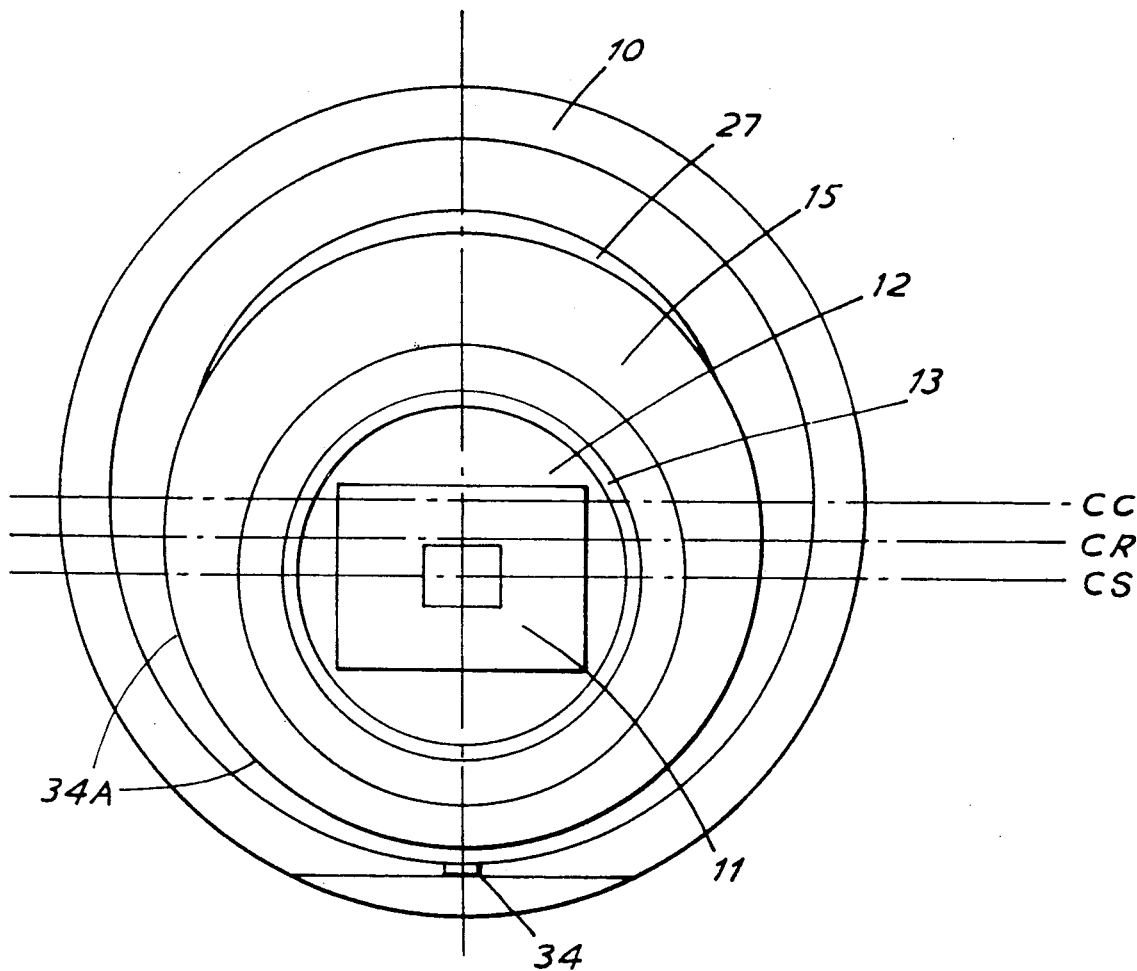
FIG. 2 is a leading end elevation in the direction of arrow II of FIG. 1.

Referring now to FIGS. 1 and 2 of the present drawings the camera has a generally cylindrical chassis member 10 which is mounted within a tubular body (not shown) which carries at its leading end a lens assembly such as a fish-eye lens for wide-angle (inspection) viewing or a telescopic lens assembly for distant (surveillance) viewing. Reference 11 denotes a CCD image sensor which is mounted at the centre of a circular printed circuit board 12 which contains signal de-coupling and which lies in the focal plane of the lens.

The printed circuit board 12 is secured to an annular holder 13 which is mounted, through roller bearings 14, in a rotary cam member 15 which will be referred to as the R-cam. The rearwardly-extending tubular part 16 of the R-cam is carried, through roller bearings 17, in a rotary cam member 18 which will be referred to as the $\theta$-cam. A tube 19 is provided to carry and protect electrical leads (not shown) which extend from a socket (not shown) at the rear end of the tubular body of the camera. This tube is mounted at its ends on corrugated diaphragms 20, 21 which are secured respectively to a ring 22 mounted coaxially in the camera chassis and to the holder 13. The diaphragms are flexible but torsionally rigid to maintain the correct (upright) orientation of the image sensor 11.

In use of the camera, X-Y movement of the sensor 11 in the focal plane of the lens is effected by the action of electric motors 23 (the $\theta$-motor) and 24 (the R-motor). The $\theta$-motor rotates the $\theta$-cam 18 through a drive pinion 25, and the R-motor rotates the R-cam 15 through a drive pinion 26 and a planet-drive sleeve 27 which is rotatably mounted in the camera chassis and which engages planet pinion part 28 of the R-cam. Thus, the $\theta$-cam controls the position of the centre CR of the R-cam and rotation of the R-cam moves the centre CS of the sensor 11 relative to centre CR. The reference CC denotes the image centre of the camera, and it will be appreciated that appropriate rotation of the two cams under the action of the motors 23 and 24 will shift the sensor centre CS a desired vector distance from the image centre CC.

The interaction between the R-cam and the $\theta$-cam caused by the planetary gearing is eliminated from the control system by means of a known constant installed in the control software to cancel the interaction. Further computation is used to remove the change of $\theta$ with operation of the R-cam.

$\theta$-cam (angular) position feedback is achieved by an opto position sensor 29 and an absolute position sensor 30, which coact with an optical encoder disc 31 on the $\theta$-cam. R-cam position feedback is derived from incremental sensing of the planet drive sleeve 27 by opto sensor 31 which coacts with encoder disc 33, and absolute sensing by a sensor 34 reading an encoder band 34A around the R-cam 15.

Figure 3:
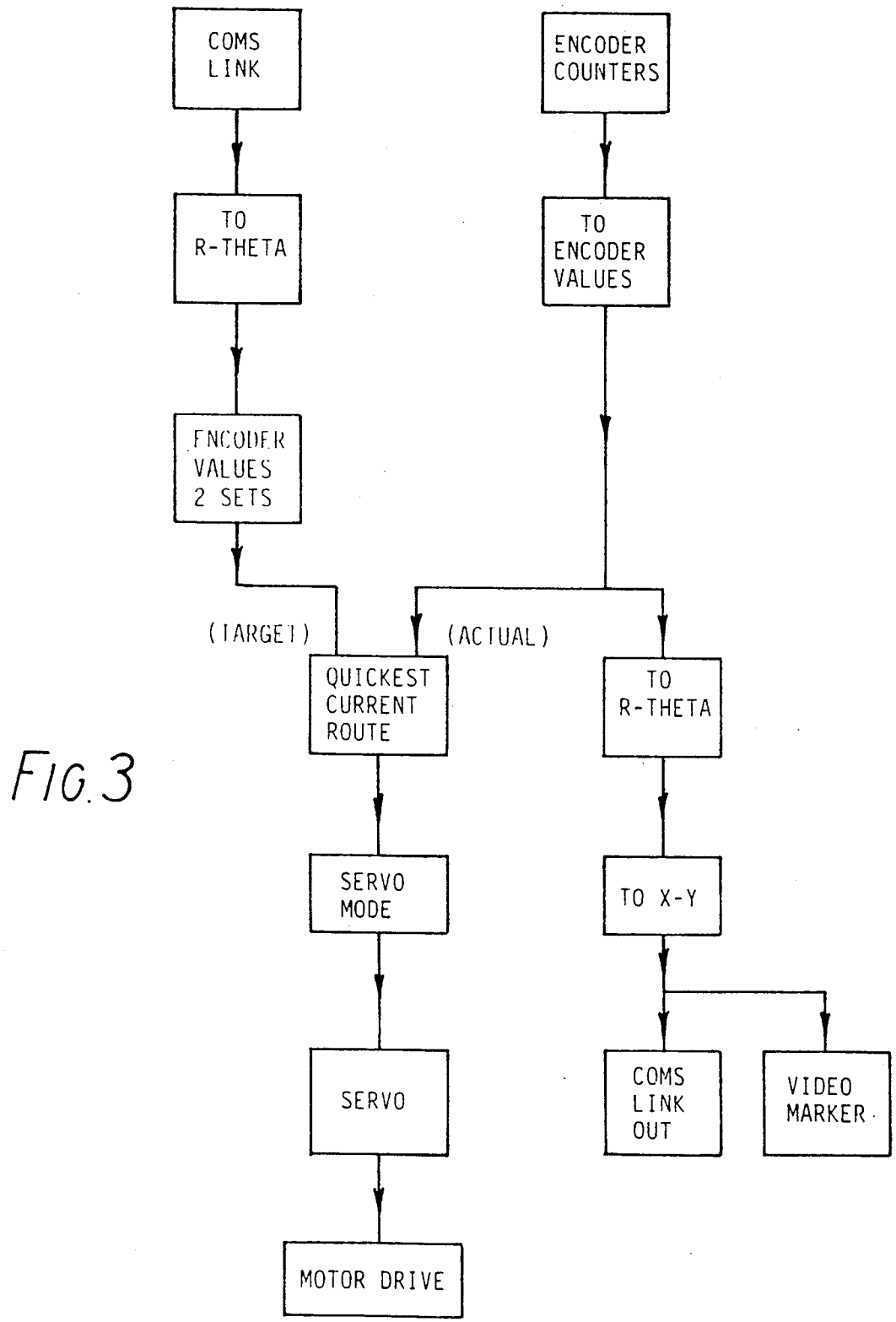
FIGS. 3, 4 and 5 are data-flow diagrams illustrating the micro-processor control system for the operating mechanism; and, FIG. 6 is a diagrammatic view of a T.V. monitor for use with the T.V. camera of the invention.
Figure 4:
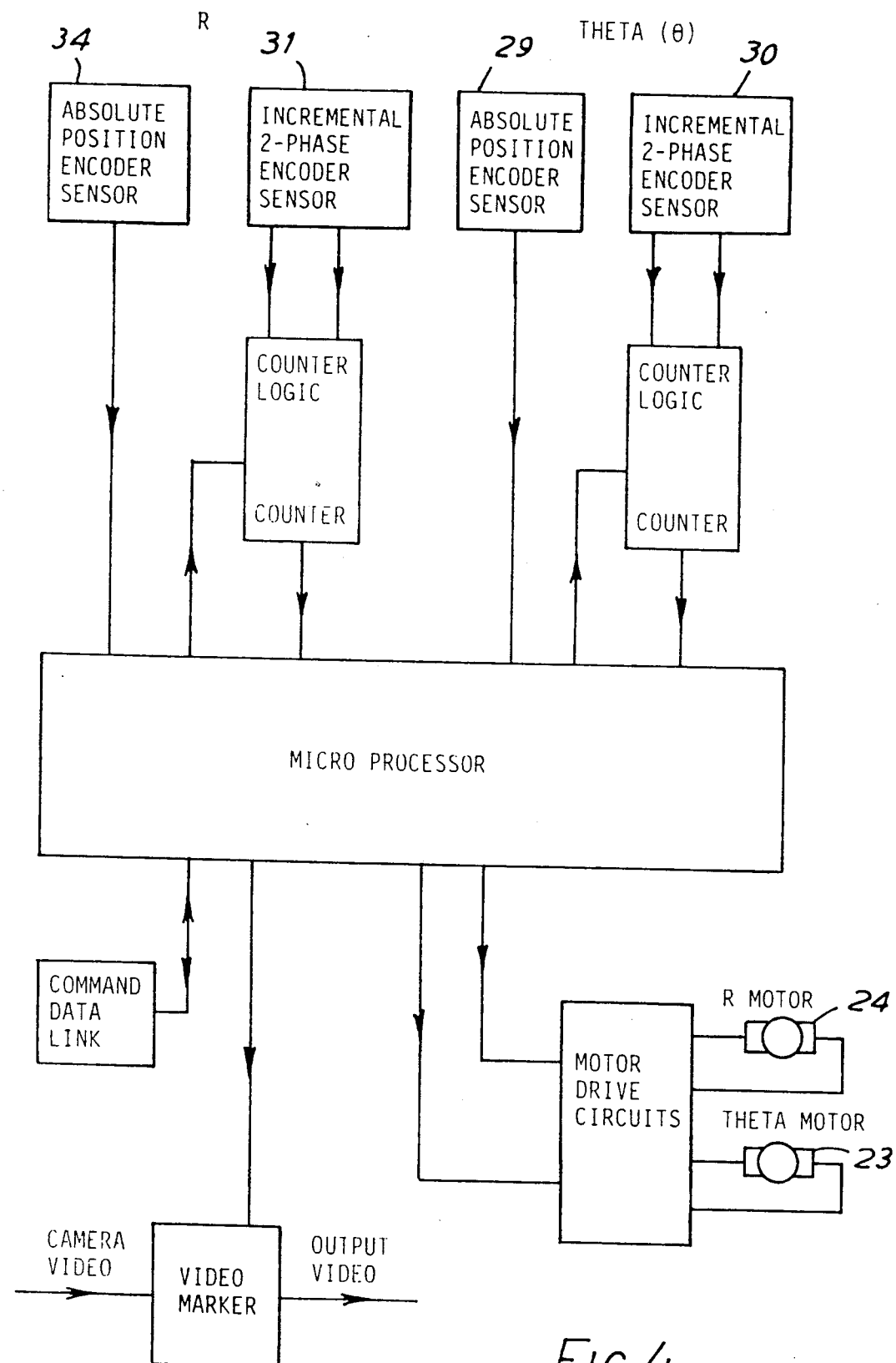

The operation of the drive mechanism for the CCD sensor 11 is controlled by a micro-processor system, as illustrated in FIGS. 3 and 4 of the present drawings and outlined as follows.

Quadrature signals from the incremental sensors 29 and 32 reading encoder discs 31 and 33, respectively, are used to increment and decrement the R and $\theta$ counters, position information from the absolute sensors 30 and 34 having been used to initialise the counters when the camera is switched on.

Figure 6:
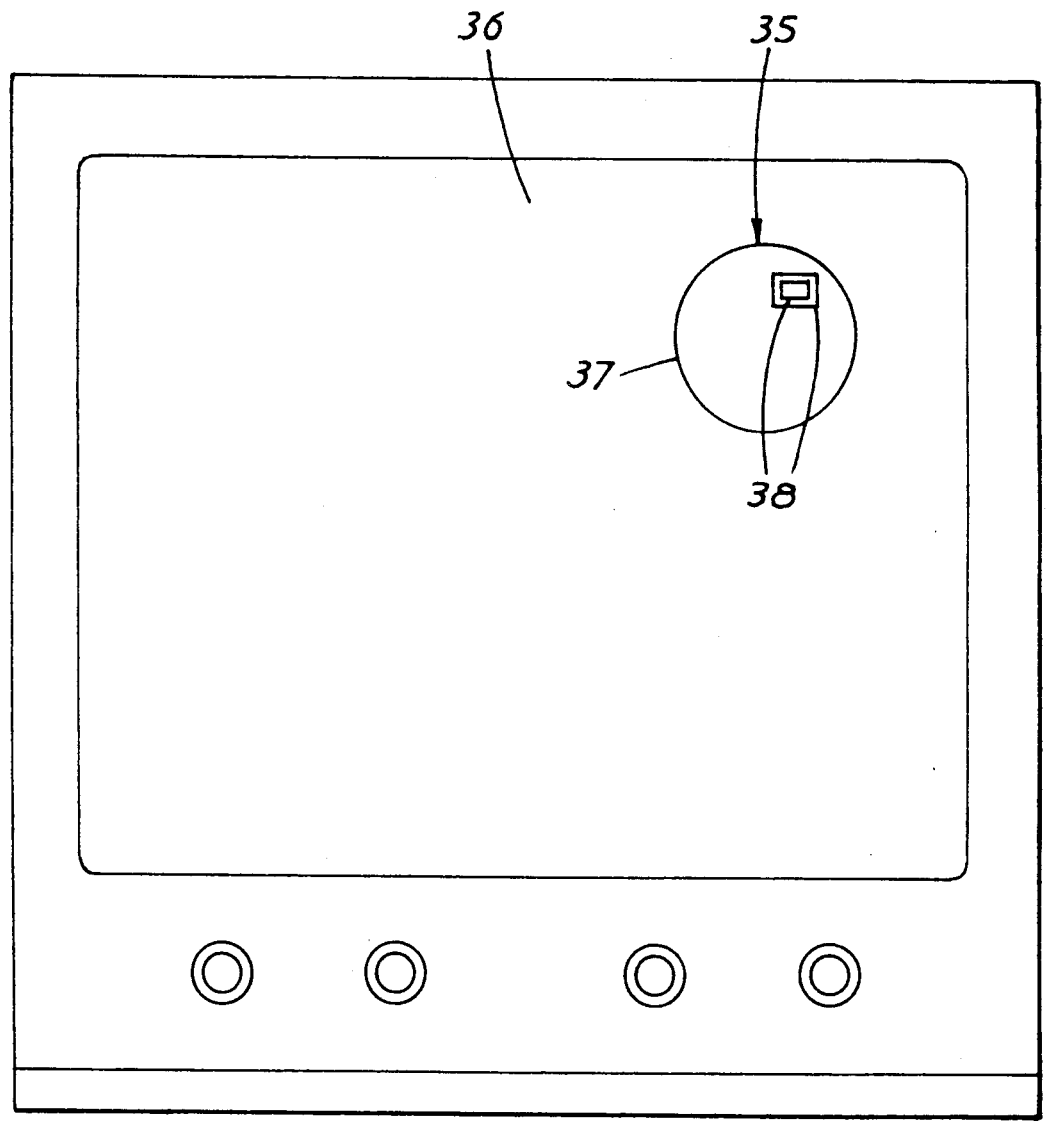

The micro-processor is programmed as shown in the dataflow diagram of FIG. 3 and the circuit diagram of FIG. 6.

The commanded X-Y position is converted to R-$\theta$ co-ordinates, and these values are used to compute desired encoder values. A decision is made as to the fastest route to this position, and the servo routine drives the motors until the required position is reached.

Figure 5:
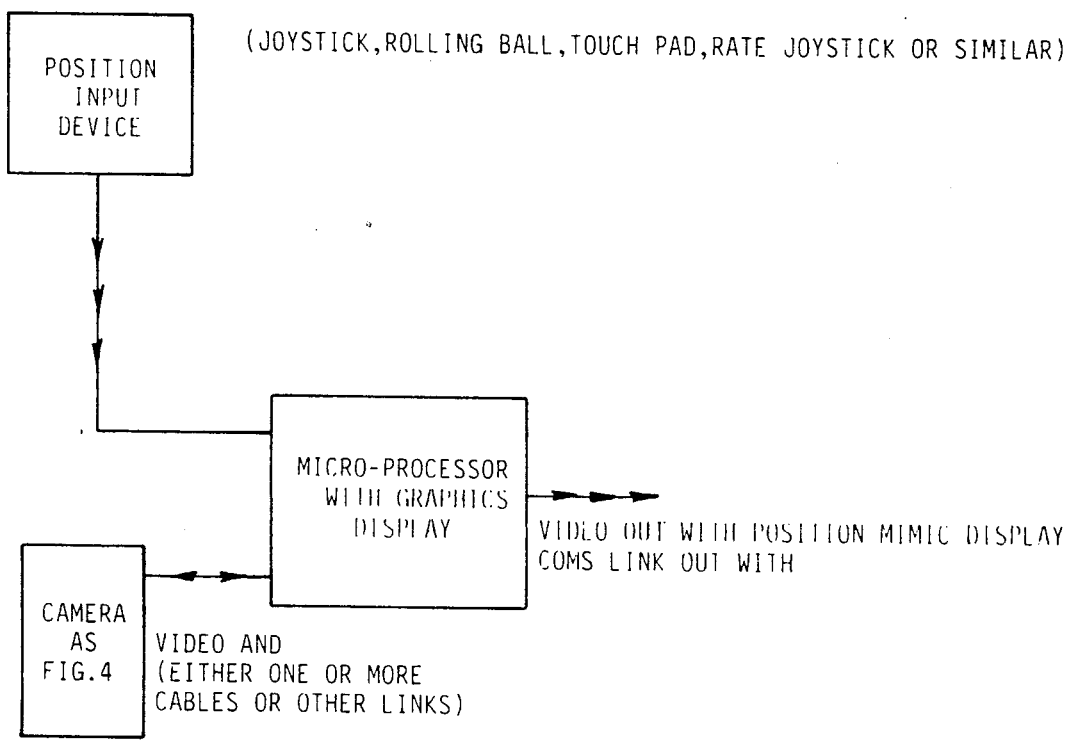

To provide remote display of position, the micro-processor computes the R-$\theta$ co-ordinates from the encoder counter values, translates these to X-Y and transmits these values to the control link. Optionally, the position may be drawn on to the camera video signal for automatic display on a monitor, as indicated in FIGS. 5 and 6.

FIG. 6 shows a T.V. monitor with an optical overlay 35 on the screen 36 which displays the images from the camera. The overlay is formed as a circle 37 representing the full area of coverage of the camera lens, and two small rectangles 36 which represent the relative position and size of the area section being viewed by the camera. Overall control of the camera may be by a remote-sited controller comprising a position in-putting device such as joystick, rolling ball, touch pac or rate joystick, connected to a micro-processor with attached graphics display unit locked to the camera video. The microprocessor sends data to the camera giving the desired position or motion. The camera sends data to the microprocessor giving current position. The micro-processor displays, via the graphics display, the two positions, i.e. current position and desired position, unless a rate control system is used when only current position is displayed.

In use, the joystick is operated to move the smaller (inner) rectangle 38 to the desired or commanded position; the larger rectangle which is derived from the encoder sensors and reflects the position of the CCD sensor 11, will quickly follow and surround the smaller rectangle to confirm that the CCD sensor has reached the desired viewing position.

Only one embodiment has been selected to illustrate the invention, but it will be appreciated by those skilled in the art that various changes and modifications can be made without departing from the scope of the invention as defined in the appended claims.

We claim:

1. In a camera system for scanning a field of view and having a camera lens, an image-sensor which is movable in the focal plane of said lens, drive means for moving the image-sensor in said focal plane, and a monitor screen; the improvement comprising means for deriving feed-back signals from said image-sensor drive means to display on said screen the position of said image-sensor and thus that section of a field of view which is being inspected, an optical overlay on said screen representing the field of view of the camera, and the position of said image-sensor being displayed within said overlay.

2. In a camera system for scanning a field of view and having a camera lens, an image-sensor which is movable in the focal plane of said lens, drive means for moving the image-sensor in said focal plane, and a monitor screen; the improvement comprising means to derive feed-back signals from image-sensor movements to display on said screen the position of the image-sensor and thus that section of a field of view which is being inspected, an optical overlay on said screen representing the field of view of the camera, and the position of said image-sensor being displayed within said overlay.

3. A scanning camera as claimed in claim 1 or claim 2, in which said drive means comprises two electric motors which together derive said image-sensor movements having components in X and Y axes, further including relative and absolute sensors which monitor the drive means, and said feed-back signals are derived from said relative and absolute sensors.

4. A scanning camera as claimed in claim 1 or claim 2, and further comprising a controller to generate command signals for moving said image-sensor to a commanded inspection position, and means to indicate said commanded position in comparison with the actual position of said image-sensor.

5. A scanning camera as claimed in claim 4, in which said commanded position and said actual position are both displayed on said monitor screen.

6. A scanning camera as claimed in claim 5, in which said commanded position and said actual position are displayed as small rectangles within said overlay which is of generally circular form.

7. A scanning camera claimed in claim 1 or claim 2, wherein said monitor screen comprises a television monitor screen.

8. In a camera system for scanning a field of view and having a camera lens, an image-sensor which is movable in the focal plane of said lens, drive means for moving the image sensor in said focal plane, and a monitor screen;

the improvement comprising means for deriving feed-back signals from said image sensor drive means to display on said screen the position of said image sensor and thus that section of a field of view which is being inspected, said drive means comprising two electric motors which together drive said image-sensor in movements having components in X and Y axes, further including relative and absolute sensors which monitor the drive means, and said feed-back signals are derived from said relative and absolute sensors.

9. In a camera system for scanning a field of view and having a camera lens, an image-sensor which is movable in the focal plane of said lens, drive means for moving the image-sensor in said focal plane, and a monitor screen; the improvement comprising means to derive feed-back signals from image-sensor movements to display on said screen the position of the image-sensor and thus that section of a field of view which is being inspected, said drive means comprising two electric motors which together drive said image-sensor in movements having components in X and Y axes, further including relative and absolute sensors which monitor the drive means, and said feed-back signals are derived from said relative and said absolute sensors.

* * * * *